No. 640,084. Patented Dec. 26, 1899.
P. H. & C. A. BOHNER.
CHAIN PIPE WRENCH.
(Application filed Aug. 29, 1899.)
(No Model.)
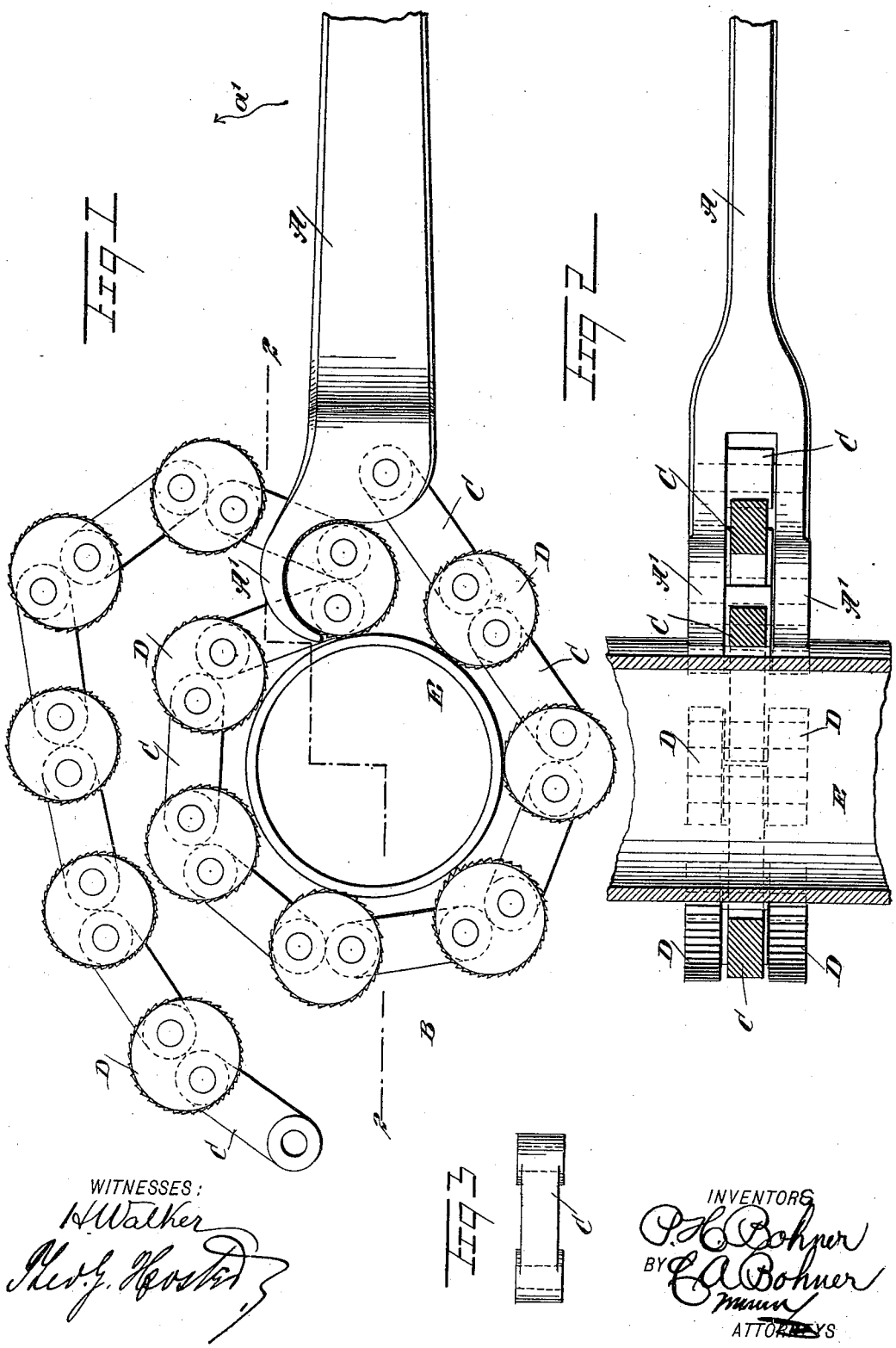
WITNESSES:
H. Walker
Theo. J. Hoster
INVENTORS
P. H. Bohner
BY C. A. Bohner
Munn
ATTORNEYS

UNITED STATES PATENT OFFICE.

PHILIP HENRY BOHNER, OF PECKVILLE, PENNSYLVANIA, AND CHARLES AMBROSE BOHNER, OF PADUCAH, TEXAS.

CHAIN PIPE-WRENCH.

SPECIFICATION forming part of Letters Patent No. 640,084, dated December 26, 1899.

Application filed August 29, 1899. Serial No. 728,897. (No model.)

*To all whom it may concern:*

Be it known that we, PHILIP HENRY BOHNER, of Peckville, in the county of Lackawanna, State of Pennsylvania, and CHARLES AMBROSE BOHNER, of Paducah, in the county of Cottle and State of Texas, have invented new and useful Improvements in Chain Pipe-Wrenches, of which the following is a full, clear, and exact description.

The object of the invention is to provide a new and improved wrench, more especially designed for use on pipes, shafts, coupling-rods, and other articles, and arranged for convenient and quick application on different-sized objects and to insure a firm positive grip at all times and an instant release when desired.

The invention consists of novel features and parts and combinations of the same, as will be fully described hereinafter, and then pointed out in the claims.

A practical embodiment of our invention is represented in the accompanying drawings, forming a part of this specification, in which similar characters of reference indicate corresponding parts in all the views.

Figure 1 is a side elevation of the improvement. Fig. 2 is a sectional plan view of the same on the line 2 2 in Fig. 1, and Fig. 3 is a plan view of one of the connecting-links.

The improved chain pipe-wrench consists, essentially, of a handled lever A and a chain B, consisting of alternately-arranged links C and disks D, preferably arranged in pairs, the links extending at their ends between the disks, as is plainly indicated in Fig. 2. One of the links C is pivotally connected with the lever A, and this end of the lever is formed with a forked hook A' for the free passage of the links C, but for engagement with a pair of disks D to close the wrench, as indicated in Fig. 1. The links C are of such a length that the disks D are spaced apart, and when the chain B is passed around the object E, as shown in Figs. 1 and 2, and the hook A' engages the corresponding pair of disks D then the operator upon swinging the lever A upward in the direction of the arrow a' causes a tightening of that part of the chain encircling the object, the disks firmly engaging the peripheral surface of the object to turn the same around, the disks being preferably provided on their peripheries with teeth for taking a firm hold on the peripheral surface of the object.

As indicated in the drawings, the pivots for two adjacent links on a pair of disks are arranged diametrically opposite each other, so that the pull of the links is exerted in the proper direction when the chain encircles the object, as shown in Fig. 1. When the operator swings the lever A in the inverse direction of the arrow a', then the forked hook A' immediately swings out of engagement with the corresponding pair of disks D, and consequently the chain is instantly released from the object and can readily slide on the same upon a further swinging of the lever in the inverse direction of the arrow a'.

As indicated in Fig. 1, the forked hook A' extends forward a distance beyond the point of where the end link C is pivoted to the lever A, so that the hook A' does not completely disengage the pair of disks upon returning the lever for taking a new grip on the object. In case the teeth on the different pairs of disks are worn out the chain can be reversed, so as to make use of the teeth on the other side of the disks.

Having thus fully described our invention, we claim as new and desire to secure by Letters Patent—

1. A chain pipe-wrench, comprising a chain formed of alternately-arranged links and gripping-disks of which the latter are arranged in pairs with the links between them, and a lever to which one end link is pivoted, said lever having a forked hook adapted to engage the disks, as set forth.

2. A chain pipe-wrench, comprising a chain formed of links and gripping-disks connected with the links on each side thereof, and a lever connected with one end link and having a forked hook in which the space between its members is less than the width of the chain, whereby the links of the latter may be inserted in said hook and the disks be engaged thereby, as set forth.

3. A chain pipe-wrench, comprising a lever having a forked hook, and a gripping-chain consisting of alternately-arranged links and gripping-disks, of which the latter are arranged in pairs with the links between them and with adjacent links for a pair of disks having separate pivots on the disks, one end link being pivoted on the lever, and the disks being adapted to be engaged by said hook, substantially as shown and described.

4. A chain pipe-wrench, comprising a lever having a forked hook, and a gripping-chain consisting of alternately-arranged links and gripping-disks, of which the latter are arranged in pairs with the links between them and with adjacent links for a pair of disks having separate pivots on the disks, one end link being pivoted on the lever, and the disks being adapted to be engaged by said hook, each of the disks having peripheral teeth for firmly gripping the object to be turned, as set forth.

PHILIP HENRY BOHNER.
CHARLES AMBROSE BOHNER.

Witnesses to the signature of Philip Henry Bohner:
S. W. ARNOLD,
A. W. THOMPSON.

Witnesses to the signature of Charles Ambrose Bohner:
ARTHUR LILE,
J. L. BACKUS.